(12) United States Patent
Fukai et al.

(10) Patent No.: US 10,989,287 B2
(45) Date of Patent: Apr. 27, 2021

(54) POWER TRANSMISSION DEVICE FOR VEHICLE

(71) Applicant: TOYOTA JIDOSHA KABUSHIKI KAISHA, Toyota (JP)

(72) Inventors: Masayuki Fukai, Nagoya (JP); Yusuke Ohgata, Miyoshi (JP); Shinji Oita, Toyota (JP); Megumi Fujikawa, Toyota (JP); Terasu Harashima, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/561,095

(22) Filed: Sep. 5, 2019

(65) Prior Publication Data
US 2020/0116243 A1   Apr. 16, 2020

(30) Foreign Application Priority Data

Oct. 16, 2018 (JP) ............................. JP2018-195439

(51) Int. Cl.
*F16H 37/02* (2006.01)

(52) U.S. Cl.
CPC ...... *F16H 37/022* (2013.01); *F16H 2037/026* (2013.01); *F16H 2200/2005* (2013.01); *F16H 2200/2035* (2013.01)

(58) Field of Classification Search
CPC .............. F16H 37/022; F16H 2037/023; F16H 2037/025; F16H 2037/026; F16H 2200/2005; F16H 2200/2035; F16D 41/12; F16D 41/16
See application file for complete search history.

(56) References Cited

U.S. PATENT DOCUMENTS

| | | | |
|---|---|---|---|
| 6,569,051 B2* | 5/2003 | Hirano | F16H 61/6648 192/44 |
| 2014/0102844 A1* | 4/2014 | Greene | F16D 41/16 192/45.1 |
| 2015/0087463 A1 | 3/2015 | Nakagawa et al. | |
| 2018/0274643 A1* | 9/2018 | Okoshi | F16H 37/021 |
| 2019/0271365 A1* | 9/2019 | Cioc | F16D 27/00 |

FOREIGN PATENT DOCUMENTS

| | | |
|---|---|---|
| EP | 1114952 A1 | 7/2001 |
| WO | 2013/176208 A1 | 11/2013 |

* cited by examiner

*Primary Examiner* — Tisha D Lewis
(74) *Attorney, Agent, or Firm* — Oliff PLC (57) ABSTRACT

A power transmission device includes a first power transmission path that is provided between an engine and a driving wheel, and a second power transmission path that is provided between the engine and the driving wheel and that is provided in parallel with the first power transmission path. The first power transmission path includes a first clutch and a secondary clutch that is arranged on the driving wheel side with respect to the first clutch. The second power transmission path includes a continuously variable transmission and a second clutch. The secondary clutch is configured to make a changeover between a first mode and a second mode.

4 Claims, 6 Drawing Sheets

POWER TRANSMISSION DEVICE FOR VEHICLE

INCORPORATION BY REFERENCE

The disclosure of Japanese Patent Application No. 2018-195439 filed on Oct. 16, 2018 including the specification, drawings and abstract is incorporated herein by reference in its entirety.

BACKGROUND

1. Technical Field

The disclosure relates to a power transmission device for a vehicle that is equipped with a first power transmission path and a second power transmission path in parallel between an engine and a driving wheel.

2. Description of Related Art

There is known a vehicular power transmission device that is equipped with a first power transmission path that is configured to be equipped with a first clutch, a gear mechanism, and a dog clutch, and a second power transmission path that is configured to be equipped with a continuously variable transmission and a second clutch, in parallel, between an engine and a driving wheel. A power transmission device for a vehicle described in WO 2013/176208 is one such example.

SUMMARY

By the way, in the power transmission device described in WO 2013/176208, the dog clutch is provided on the first power transmission path. Then, when the vehicle assumes a running state where the first clutch rotates at high speed, the first clutch is prevented from rotating at high speed, by releasing the dog clutch. However, the dog clutch of WO 2013/176208 is configured to be equipped with a synchronization mechanism, so the number of parts has increased and the cost of manufacturing has become high.

The disclosure makes it possible to reduce the cost of manufacturing in a power transmission device for a vehicle that includes a first power transmission path and a second power transmission path in parallel between an engine and a driving wheel.

An aspect of the disclosure is a power transmission device for a vehicle. The power transmission device includes a first power transmission path that is provided between an engine and a driving wheel, and a second power transmission path that is provided between the engine and the driving wheel and that is provided in parallel with the first power transmission path. The first power transmission path includes a first clutch and a secondary clutch that is provided on the driving wheel side with respect to the first clutch. The second power transmission path includes a continuously variable transmission and a second clutch. The secondary clutch is configured to make a changeover between a first mode and a second mode. The first mode ensures that a first motive power acting in a normal rotation direction is transmitted and that a second motive power acting in a reverse rotation direction is blocked. The second mode ensures that at least the second motive power acting in the reverse rotation direction is transmitted.

With the aforementioned configuration, the secondary clutch is configured as the secondary clutch that can be changed over to at least the first mode and the second mode. Therefore, by being changed over to the first mode, the secondary clutch can transmit the motive power acting in the normal rotation direction (a vehicle forward direction) in the first power transmission path. Besides, by being changed over to the second mode, the secondary clutch can transmit the motive power acting in the reverse rotation direction (a vehicle backward direction) in the first power transmission path. Besides, while the vehicle runs via the second transmission path, the secondary clutch can block the rotation transmitted from the driving wheel side by being changed over to the first mode. Therefore, the first clutch and the like, which are located on the engine side with respect to the secondary clutch, are prevented from rotating at high speed. In this manner, the vehicle is enabled to run forward and backward via the first power transmission path, and the first clutch is prevented from rotating at high speed, by changing over the mode of the secondary clutch. Thus, the vehicle is enabled to run in the same manner as in the case where the dog clutch having the synchronization mechanism is provided as the secondary clutch in the first power transmission path. Besides, the secondary clutch does not require the synchronization mechanism or the like, so the number of parts is smaller, and the cost of manufacturing can be further reduced than in the case where the dog clutch having the synchronization mechanism is provided in the first power transmission path.

The power transmission device for the vehicle may include an actuator for making a changeover between the first mode of the secondary clutch and the second mode of the secondary clutch. The actuator may be provided on a same rotary shaft as the secondary clutch.

With the aforementioned configuration, the actuator for changing over the mode of the secondary clutch is arranged on the same rotary shaft as the secondary clutch. Therefore, the actuator can be compactly configured by aggregating parts constituting the actuator at a position that is adjacent to the secondary clutch.

In the power transmission device for the vehicle, the secondary clutch may be set in such a manner as to change over to the first mode with no working fluid supplied to the actuator.

With the aforementioned configuration, the secondary clutch changes over to the first mode with no working fluid supplied to the actuator. Therefore, there is no need to supply working fluid to the actuator while the vehicle runs in the first mode. Thus, the amount of consumption of working fluid can be reduced.

In the power transmission device for the vehicle, the secondary clutch may include an input-side rotary member that is coupled to the engine in such a manner as to enable transmission of the motive power, an output-side rotary member that is coupled to the driving wheel in such a manner as to enable transmission of the motive power, and a first strut and a second strut that are interposed between the input-side rotary member and the output-side rotary member. The first strut may be configured to keep the input-side rotary member and the output-side rotary member from rotating relatively to each other when the first motive power acting in the normal rotation direction is transmitted the secondary clutch in the first mode. The second strut may be configured to keep the input-side rotary member and the output-side rotary member from rotating relatively to each other when the second motive power acting in the reverse rotation direction is transmitted the secondary clutch in the second mode.

With the aforementioned configuration, when the motive power acting in the normal rotation direction is transmitted to the secondary clutch with the secondary clutch in the first mode, the input-side rotary member and the output-side rotary member are kept from rotating relatively to each other, so the motive power acting in the normal rotation direction can be transmitted to the driving wheel. Besides, when the motive power acting in the reverse rotation direction is transmitted to the secondary clutch with the secondary clutch in the second mode, the input-side rotary member and the output-side rotary member are kept from rotating relatively to each other, so the motive power acting in the reverse rotation direction can be transmitted to the driving wheel.

In the power transmission device for the vehicle, the actuator may include a pressing piston and a spring. The pressing piston may be provided at a position that is adjacent to an output-side rotary member in an axial direction of the rotary shaft. The spring may be configured to abut on the pressing piston and urge the pressing piston toward the output-side rotary member. The spring may be interposed between the pressing piston and a counter gear that is provided on the rotary shaft, in the axial direction of the rotary shaft.

With the aforementioned configuration, the spring is interposed between the pressing piston and the counter gear. Thus, the number of parts can be restrained from increasing, by utilizing the counter gear as a member that generates a reaction force of the spring.

In the power transmission device for the vehicle, part of the pressing piston may overlap with the counter gear when the counter gear and the pressing piston are viewed from outside in a radial direction of the rotary shaft.

With the aforementioned configuration, part of the pressing piston overlaps with the counter gear when viewed from outside in the radial direction of the rotary shaft. Thus, the mechanism around the actuator can be compactly configured in the axial direction of the rotary shaft.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The embodiments of the disclosure will be described hereinafter in detail with reference to the drawings. Incidentally, the drawings are simplified or transformed as appropriate in the following embodiment, and the dimensional ratios, shapes, and the like of respective components are not necessarily depicted with precision.

Figure 1:
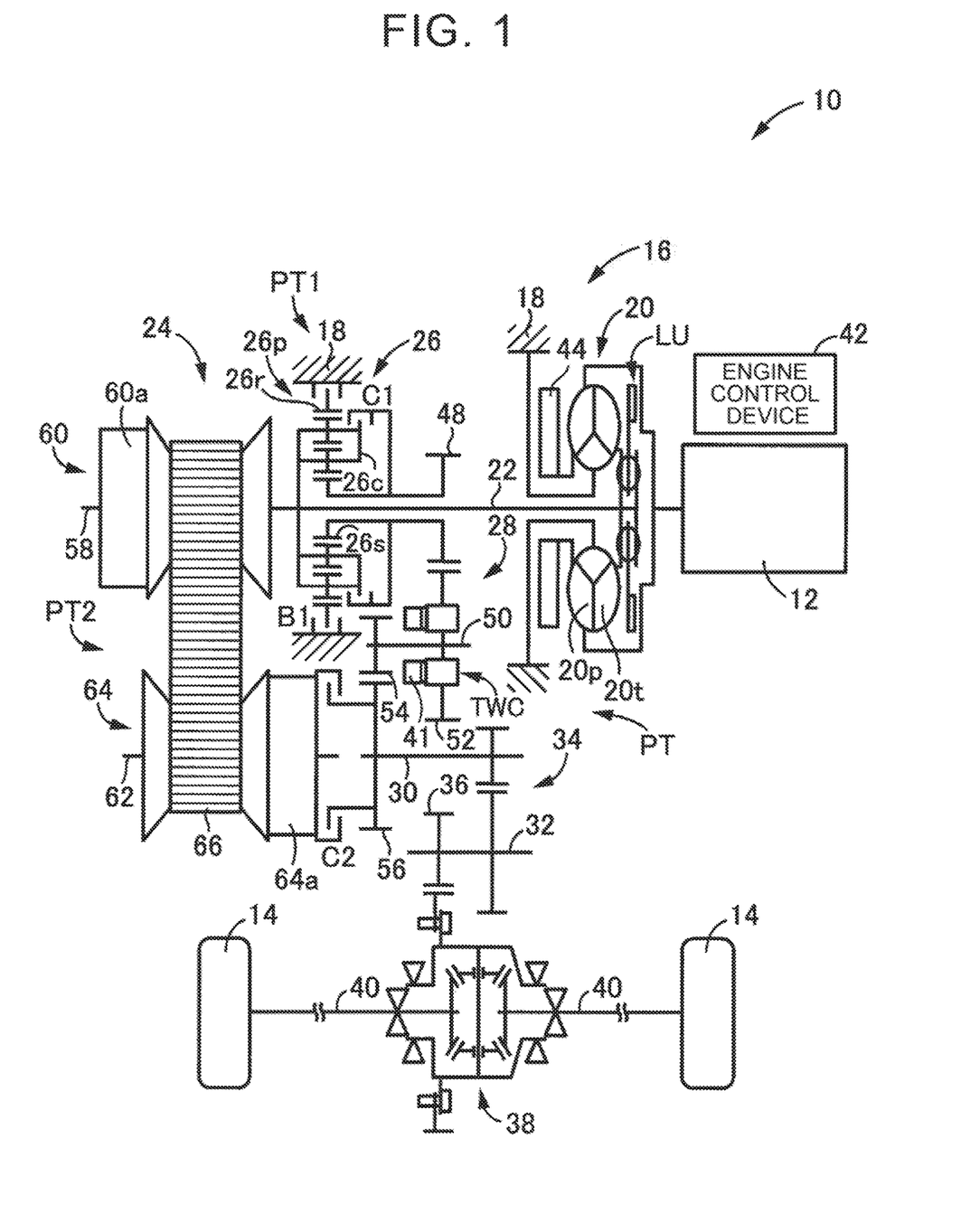
FIG. 1 is a view illustrating the schematic configuration of a vehicle to which the disclosure is applied.

FIG. 1 is a view illustrating the schematic configuration of a vehicle 10 to which the disclosure is applied. In FIG. 1, the vehicle 10 is equipped with a vehicular power transmission device 16 (hereinafter referred to as the power transmission device 16) that transmits a motive power of an engine 12 functioning as a motive power source to driving wheels 14.

The power transmission device 16 is provided between the engine 12 and the driving wheels 14. The power transmission device 16 is equipped with a known torque converter 20 as a hydraulic transmission device that is coupled to the engine 12, an input shaft 22 that is coupled to the torque converter 20, a belt-type continuously variable transmission 24 that is coupled to the input shaft 22, a forward/backward changeover device 26 that is also coupled to the input shaft 22, a gear mechanism 28 that is coupled to the input shaft 22 via the forward/backward changeover device 26 and that is provided in parallel with the continuously variable transmission 24, an output shaft 30 as an output rotary member that is common to the continuously variable transmission 24 and the gear mechanism 28, a countershaft 32, a reduction gear device 34 that is constituted of a pair of gears that are provided on the output shaft 30 and the countershaft 32 respectively in a relatively unrotatable manner and that mesh with each other, a gear 36 that is provided on the countershaft 32 in a relatively unrotatable manner, a differential device 38 that is coupled to the gear 36 in such a manner as to enable transmission of the motive power, and a pair of right and left axles 40 that couple the differential device 38 to the right and left driving wheels 14 respectively, in a case 18 as a non-rotary member.

In the power transmission device 16 thus configured, the motive power output from the engine 12 is transmitted to the right and left driving wheels 14 sequentially via the torque converter 20, the forward/backward changeover device 26, the gear mechanism 28, the reduction gear device 34, the differential device 38, the axles 40 and the like. Alternatively, in the power transmission device 16, the motive power output from the engine 12 is transmitted to the right and left driving wheels 14 sequentially via the torque converter 20, the continuously variable transmission 24, the reduction gear device 34, the differential device 38, the axles 40 and the like. The motive power is synonymous with a torque or a power when they are not distinguished from each other in particular.

The power transmission device 16 is equipped with the gear mechanism 28 and the continuously variable transmission 24, which are provided in parallel with the power transmission path PT between the engine 12 and the driving wheels 14. In concrete terms, the power transmission device 16 is equipped with two power transmission paths that are provided in parallel with each other between the input shaft 22 and the output shaft 30 and that each enable transmission of the motive power of the engine 12 from the input shaft 22 to the output shaft 30. The two power transmission paths are a first power transmission path PT1 that is configured to include the gear mechanism 28, and a second power transmission path PT2 that is configured to include the continuously variable transmission 24. That is, the power transmission device 16 is equipped with the two power transmission paths, namely, the first power transmission path PT1 and the second power transmission path PT2, in parallel with each other between the input shaft 22 and the output shaft 30.

The first power transmission path PT1 is a power transmission path that is equipped with the forward/backward changeover device 26 that is configured to include a first clutch C1 and a first brake B1, the gear mechanism 28, and a two-way clutch TWC functioning as a secondary clutch, and that ensures that the motive power of the engine 12 is transmitted from the input shaft 22 to the driving wheels 14 via the gear mechanism 28. In the first power transmission path PT1, the forward/backward changeover device 26, the gear mechanism 28, and the two-way clutch TWC are arranged in this sequence from the engine 12 toward the driving wheels 14. Thus, the two-way clutch TWC is arranged on the driving wheel 14 sides with respect to the first clutch C1. The second power transmission path PT2 is a power transmission path that is equipped with the continuously variable transmission 24 and a second clutch C2, and that ensures that the motive power of the engine 12 is transmitted from the input shaft 22 to the driving wheels 14 via the continuously variable transmission 24. In the second power transmission path PT2, the continuously variable transmission 24 and the second clutch C2 are arranged in this sequence from the engine 12 toward the driving wheels 14.

The continuously variable transmission 24 that constitutes the second power transmission path PT2 is equipped with a primary shaft 58 that is provided coaxially with the input shaft 22 and that is integrally coupled to the input shaft 22, a primary pulley 60 that is coupled to the primary shaft 58 and whose effective diameter is variable, a secondary shaft 62 that is provided coaxially with the output shaft 30, a secondary pulley 64 that is coupled to the secondary shaft 62 and whose effective diameter is variable, and a transmission belt 66 as a transmission element that is wound between the respective pulleys 60 and 64. The continuously variable transmission 24 is a known belt-type continuously variable transmission that carries out the transmission of the motive power via a frictional force between each of the pulleys 60 and 64 and the transmission belt 66. The continuously variable transmission 24 transmits the motive power of the engine 12 to the driving wheel 14 sides. In the continuously variable transmission 24, the effective diameter of the primary pulley 60 is changed by a hydraulic actuator 60a, and the effective diameter of the secondary pulley 64 is changed by a hydraulic actuator 64a. Thus, a speed ratio γcvt of the continuously variable transmission 24 is adjusted.

Besides, a gear ratio EL in the first power transmission path PT1 having the gear mechanism 28 (=an input shaft rotational speed Nin/an output shaft rotational speed Nout) is set to a value larger than a lowermost speed ratio γmax of the continuously variable transmission 24 as a maximum speed ratio in the second power transmission path PT2. That is, the gear ratio EL is set as a speed ratio that is lower than the lowermost speed ratio γmax. Thus, a higher speed ratio is formed in the second power transmission path PT2 than in the first power transmission path PT1. Incidentally, the input shaft rotational speed Nin is a rotational speed of the input shaft 22, and the output shaft rotational speed Nout is a rotational speed of the output shaft 30.

In the power transmission device 16, the power transmission path through which the motive power of the engine 12 is transmitted to the driving wheels 14 is changed over between the first power transmission path PT1 and the second power transmission path PT2 in accordance with the running state of the vehicle 10. Therefore, the power transmission device 16 is equipped with a plurality of engagement devices for selectively forming the first power transmission path PT1 and the second power transmission path PT2. The plurality of the engagement devices correspond to the first clutch C1, the first brake B1, the second clutch C2, and the two-way clutch TWC.

The first clutch C1 is an engagement device that is provided on the first power transmission path PT1 and that is designed to selectively connect and disconnect the first power transmission path PT1, and is an engagement device that enables the transmission of the motive power through the first power transmission path PT1 by being engaged when the vehicle runs forward. The first brake B1 is an engagement device that is provided on the first power transmission path PT1 and that is designed to selectively connect and disconnect the first power transmission path PT1, and is an engagement device that enables the transmission of the motive power through the first power transmission path PT1 by being engaged when the vehicle runs backward. The first power transmission path PT1 is formed through engagement of the first clutch C1 or the first brake B1.

The second clutch C2 is an engagement device that is provided in the second power transmission path PT2 and that is designed to selectively connect and disconnect the second power transmission path PT2, and is an engagement device that enables the second power transmission path PT2 to transmit the motive power by being engaged when the vehicle runs forward. Each of the first clutch C1, the first brake B1, and the second clutch C2 is a known hydraulic wet frictional engagement device that is frictionally engaged by a hydraulic actuator. Each of the first clutch C1 and the first brake B1 is an element that constitutes the forward/backward changeover device 26.

The two-way clutch TWC is provided in the first power transmission path PT1, and is configured to be changeable over between a one-way mode in which a motive power acting in a vehicle forward direction is transmitted and a motive power acting in a vehicle backward direction is blocked, and a lock mode in which the power acting in the vehicle forward direction and the motive power acting in the vehicle backward direction are transmitted. Incidentally, the vehicle forward direction corresponds to the normal rotation direction of the disclosure, and the vehicle backward direction corresponds to the reverse rotation direction of the disclosure. Besides, the one-way mode corresponds to the first mode of the disclosure, and the lock mode corresponds to the second mode of the disclosure.

For example, when the motive power acting in the vehicle forward direction is transmitted to the two-way clutch TWC from the engine 12 with the two-way clutch TWC changed over to the one-way mode, the motive power is transmitted to the driving wheels 14 via the two-way clutch TWC. On the other hand, when the motive power acting in the vehicle backward direction is transmitted to the two-way clutch TWC from the engine 12 with the two-way clutch TWC changed over to the one-way mode, the motive power is blocked by the two-way clutch TWC.

Besides, when the motive power acting in the vehicle forward direction is transmitted to the two-way clutch TWC from the engine 12 with the two-way clutch TWC changed over to the lock mode, the motive power is transmitted to the driving wheels 14 via the two-way clutch TWC. By the same token, when the motive power acting in the vehicle backward direction is transmitted to the two-way clutch TWC from the engine 12 with the two-way clutch TWC changed over to the lock mode, the motive power is transmitted to the driving wheels 14 via the two-way clutch TWC. Furthermore, when the vehicle is caused to coast by canceling depression of an accelerator pedal while the vehicle runs forward with the two-way clutch TWC changed over to the lock mode, the rotation of the driving wheels 14 is transmitted to the engine 12 side via the two-way clutch TWC, and the engine 12 is dragged to cause engine braking. Incidentally, the structure of the two-way clutch TWC will be described later.

The engine 12 is equipped with an engine control device 42 having various pieces of equipment that are needed to perform output control of the engine 12, such as an electronic throttle device, a fuel injection device, an ignition device and the like. The engine control device 42 of the engine 12 is controlled in accordance with an accelerator operation amount θacc as an operation amount of the accelerator pedal corresponding to an amount of a driving request made by a driver for the vehicle 10, by an electronic control unit (not shown). Thus, an engine torque Te as an output torque of the engine 12 is controlled.

The torque converter 20 is equipped with a pump impeller 20p that is provided between the engine 12 and the continuously variable transmission 24 and that is coupled to the engine 12, and a turbine impeller 20t that is coupled to the input shaft 22. The torque converter 20 is a fluid transmission device that transmits the motive power of the engine 12 to the input shaft 22. The torque converter 20 is equipped with a known lockup clutch LU that can directly couple the pump impeller 20p and the turbine impeller 20t, namely, input and output rotary members of the torque converter 20 to each other. The lockup clutch LU directly couples the pump impeller 20p and the turbine impeller 20t (i.e., the engine 12 and the input shaft 22) to each other in accordance with a running state of the vehicle. For example, in a relatively high vehicle speed range, the engine 12 and the input shaft 22 are directly coupled to each other by the lockup clutch LU.

The power transmission device 16 is equipped with a mechanical oil pump 44 that is coupled to the pump impeller 20p. By being rotationally driven by the engine 12, the oil pump 44 supplies an original pressure of a working fluid pressure for performing shift control of the continuously variable transmission 24, generating a belt clamping force in the continuously variable transmission 24, changing over an operation state such as engagement, release and the like of each of the plurality of the engagement devices, and changing over an operation state of the lockup clutch LU to an oil pressure control circuit (not shown) with which the vehicle 10 is equipped.

The forward/backward changeover device 26 is equipped with a double pinion-type planetary gear device 26p, the first clutch C1, and the first brake B1. The planetary gear device 26p is a differential mechanism having three rotary elements, namely, a carrier 26c as an input element, a sun gear 26s as an output element, and a ring gear 26r as a reaction element. The carrier 26c is coupled to the input shaft 22. The ring gear 26r is selectively coupled to the case 18 via the first brake B1. The sun gear 26s is coupled to a small-diameter gear 48 that is arranged on an outer peripheral side of the input shaft 22 and that is provided in such a manner as to enable rotation relative to the input shaft 22. The carrier 26c and the sun gear 26s are selectively coupled to each other via the first clutch C1.

The gear mechanism 28 is equipped with the small-diameter gear 48, a countershaft 50, and a large-diameter gear 52 that is provided on the countershaft 50 in such a manner as to enable rotation relative thereto and that meshes with the small-diameter gear 48. Besides, a counter gear 54 that meshes with an output gear 56 provided on the output shaft 30 is provided on the countershaft 50 unrotatably relatively thereto. Incidentally, the countershaft 50 corresponds to the rotary shaft of the disclosure.

The two-way clutch TWC is provided between the large-diameter gear 52 and the counter gear 54 in an axial direction of the countershaft 50. The two-way clutch TWC is provided on the driving wheel 14 sides with respect to the gear mechanism 28, in the first power transmission path PT1. The two-way clutch TWC is configured to be changeable over to one of the one-way mode and the lock mode, by a hydraulic actuator 41.

Figure 2:
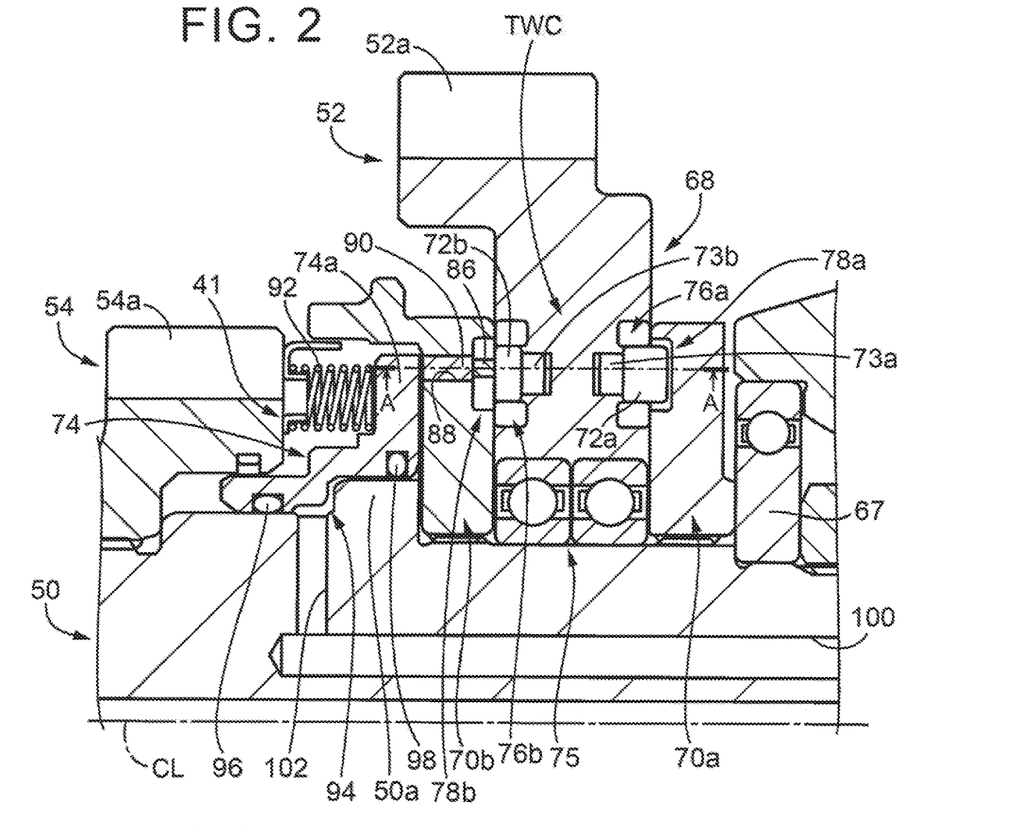
FIG. 2 is a cross-sectional view of a two-way clutch of FIG. 1.

FIG. 2 is a cross-sectional view for illustrating the structures of the two-way clutch TWC and the hydraulic actuator 41 for changing over the mode of the two-way clutch TWC. In FIG. 2, the countershaft 50 is arranged rotatably around an axis CL of rotation. Both the two-way clutch TWC and the hydraulic actuator 41 are arranged on the countershaft 50 as the rotary shaft. That is, the two-way clutch TWC and the hydraulic actuator 41 are arranged concentrically with the countershaft 50. The two-way clutch TWC and the hydraulic actuator 41 are provided on an outer peripheral side of the countershaft 50. Incidentally, the large-diameter gear 52, the counter gear 54, the two-way clutch TWC, and the hydraulic actuator 41 are substantially symmetric with respect to the axis CL of rotation. Therefore, a lower-half below the axis CL of rotation is omitted in FIG. 2.

The large-diameter gear 52 is formed in the shape of a circular disc, and is relatively rotatably fitted to an outer periphery of the countershaft 50 via a bearing 75. Meshing teeth 52a of the large-diameter gear 52 that meshes with the small-diameter gear 48 are formed on an outer peripheral side of the large-diameter gear 52. Besides, an inner peripheral side of the large-diameter gear 52 functions as a later-described input-side rotary member 68 that constitutes the two-way clutch TWC. That is, the large-diameter gear 52 and the input-side rotary member 68 of the two-way clutch TWC are integrally molded.

The counter gear 54 is annularly formed, and an inner peripheral portion of the counter gear 54 is fixed to an outer peripheral surface of the countershaft 50 relatively unrotatably and relatively immovably in the axial direction. Incidentally, the counter gear 54 corresponds to the gear of the disclosure.

The two-way clutch TWC is configured to include the input-side rotary member 68 that is formed on the inner peripheral side of the large-diameter gear 52, a first output-side rotary member 70a and a second output-side rotary member 70b that are arranged at a position that is adjacent to the input-side rotary member 68 in the axial direction of the countershaft 50 (it will be assumed hereinafter that the axial direction corresponds to the axial direction of the countershaft 50 unless otherwise specified), a plurality of first struts 72a and a plurality of torsion coil springs 73a that are interposed between the input-side rotary member 68 and the first output-side rotary member 70a in the axial direction, and a plurality of second struts 72b and a plurality of torsion coil springs 73b that are interposed between the input-side rotary member 68 and the second output-side rotary member 70b in the axial direction. Besides, the bearing 75 that holds the input-side rotary member 68 and the countershaft 50 rotatable relatively to each other is interposed between an inner peripheral surface of the input-side rotary member 68 and the outer peripheral surface of the countershaft 50. Incidentally, each of the first output-side rotary member 70a and the second output-side rotary member 70b corresponds to the output-side rotary member of the disclosure.

The input-side rotary member 68 is formed in the shape of a circular disc, and is arranged rotatably around the axis CL of rotation relatively to the countershaft 50. The input-side rotary member 68 is arranged in such a manner as to be sandwiched between the first output-side rotary member 70a and the second output-side rotary member 70b in the axial direction. Besides, the meshing teeth 52a of the large-diameter gear 52 are formed on an outer peripheral side of the input-side rotary member 68. Thus, the input-side rotary member 68 is coupled to the engine 12 in such a manner as to enable transmission of the motive power, via the gear mechanism 28, the forward/backward changeover device 26 and the like.

First accommodation portions 76a in which the first struts 72a and the torsion coil springs 73a are accommodated respectively are formed in that surface of the input-side rotary member 68 which is opposed to the first output-side rotary member 70a in the axial direction. A plurality of the first accommodation portions 76a are formed at equal angular intervals in the circumferential direction. Besides, second accommodation portions 76b in which the second struts 72b and the torsion coil springs 73b are accommodated respectively are formed in that surface of the input-side rotary member 68 which is opposed to the second output-side rotary member 70b in the axial direction. A plurality of the second accommodation portions 76b are formed at equal angular intervals in the circumferential direction. The first accommodation portions 76a and the second accommodation portions 76b are formed at the same positions respectively in the radial direction of the input-side rotary member 68.

The first output-side rotary member 70a is formed in the shape of a circular disc, and is arranged in such a manner as to be sandwiched between the bearing 75 and a bearing 67 in the axial direction. Besides, an inner peripheral portion of the first output-side rotary member 70a is spline-fitted to the countershaft 50, and the first output-side rotary member 70a thereby rotates integrally with the countershaft 50. The first output-side rotary member 70a is coupled to the driving wheels 14 in such a manner as to enable transmission of the motive power, via the counter gear 54, the output gear 56, the output shaft 30, the differential device 38, and the like. First recess portions 78a that are recessed away from the input-side rotary member 68 are formed in that surface of the first output-side rotary member 70a which is opposed to the input-side rotary member 68 in the axial direction.

The first recess portions 78a thus formed are equal in number to the first accommodation portions 76a, and are arranged at equal angular intervals in the circumferential direction. Besides, each of the first recess portions 78a is formed at the same position as each of the first accommodation portions 76a formed in the input-side rotary member 68, in the radial direction of the first output-side rotary member 70a. Accordingly, when the rotational position of each of the first accommodation portions 76a and the rotational position of each of the first recess portions 78a coincide with each other, each of the first accommodation portions 76a and each of the first recess portions 78a are adjacent to each other in the axial direction (see FIG. 2).

The second output-side rotary member 70b is an annular member with an L-shaped cross-section, and is arranged in such a manner as to be sandwiched, in the axial direction, between the bearing 75 and a flange portion 50a that protrudes in the radial direction from the outer peripheral surface of the countershaft 50. Besides, an inner peripheral portion of the second output-side rotary member 70b is spline-fitted to the countershaft 50, and the second output-side rotary member 70b thereby rotates integrally with the countershaft 50. The second output-side rotary member 70b is coupled to the driving wheels 14 in such a manner as to enable transmission of the motive power via the counter gear 54, the output gear 56, the output shaft 30, the differential device 38, and the like. Second recess portions 78b that are recessed away from the input-side rotary member 68 are formed in that surface of the second output-side rotary member 70b which is opposed to the input-side rotary member 68 in the axial direction.

The second recess portions 78b thus formed are equal in number to the second accommodation portions 76b, and are arranged at equal angular intervals in the circumferential direction. Besides, each of the second recess portions 78b is formed at the same position as each of the second accommodation portions 76b formed in the input-side rotary member 68, in the radial direction of the second output-side rotary member 70b. Accordingly, when the rotational position of each of the second accommodation portions 76b and the rotational position of each of the second recess portions 78b coincide with each other, each of the second accommodation portions 76b and each of the second recess portions 78b are adjacent to each other in the axial direction (see FIG. 2).

A plurality of through-holes 88 that are parallel to the axis CL of rotation are formed through the second output-side rotary member 70b. The through-holes 88 penetrate the second output-side rotary member 70b in the axial direction. Besides, each of the through-holes 88 is formed at a position overlapping with each of the second recess portions 78b when viewed in the axial direction of the countershaft 50. Accordingly, one end of each of the through-holes 88 communicates with each of the second recess portions 78b. Pins 90 are inserted through the through-holes 88 respectively. Each of the pins 90 is formed in the shape of a circular cylinder, and can slide within each of the through-holes 88. One end of each of the pins 90 is held in abutment on a later-described pressing piston 74 that constitutes the hydraulic actuator 41, and the other end of each of the pins 90 is held in abutment on each of annular rings 86 that are accommodated in the second recess portions 78b respectively.

The rings 86 are fitted to a plurality of arc-like grooves 84 (see FIGS. 3 and 4) that are formed in the second output-side rotary member 70b and that are formed in such a manner as to join the second recess portions 78b that are adjacent to each other in the circumferential direction (see FIGS. 3 and 4), and are movable relatively to the second output-side rotary member 70b in the axial direction. Accordingly, as shown in FIG. 2, when each of the pins 90 moves toward the input-side rotary member 68 side in the axial direction by being pressed by the pressing piston 74, each of the rings 86 also moves toward the input-side rotary member 68 side in the axial direction by being pressed by each of the pins 90. With each of the pins 90 shown in FIG. 2 moved to the utmost toward the input-side rotary member 68 side in the axial direction, an end portion of each of the rings 86 in the axial direction is moved to a position of a mating surface of the input-side rotary member 68 and the second output-side rotary member 70b. At this time, each of the second struts 72b accommodated in each of the second accommodation portions 76b is pressed by each of the rings 86, and each of the second struts 72b is thereby kept from moving toward each of the second recess portion 78b sides. Incidentally, the state shown in FIG. 2 corresponds to the state of the one-way mode of the two-way clutch TWC.

Each of the pins 90 is moved in the axial direction by the hydraulic actuator 41. As is the case with the two-way clutch TWC, the hydraulic actuator 41 is arranged on the countershaft 50. The hydraulic actuator 41 is provided at a position that is adjacent to the second output-side rotary member 70b of the two-way clutch TWC in the axial direction, between the counter gear 54 and the two-way clutch TWC in the axial direction.

The hydraulic actuator 41 is equipped with the pressing piston 74, a plurality of coil springs 92 that are interposed between the counter gear 54 and the pressing piston 74 in the axial direction, and a hydraulic chamber 94 that is formed by being surrounded by the pressing piston 74 and the countershaft 50.

The pressing piston 74 is formed in the shape of a circular cylinder, and an inner peripheral surface of the pressing piston 74 is slidably fitted to the outer peripheral surface of the countershaft 50. A pair of O-rings 96 and 98 are interposed between the inner peripheral surface of the pressing piston 74 and the outer peripheral surface of the countershaft 50. Accordingly, the hydraulic chamber 94, which is formed between the pair of the O-rings 96 and 98 in the axial direction, is an oil-tight space.

A flange portion 74a that extends in the radial direction is formed on the pressing piston 74 on the second output-side rotary member 70b side in the axial direction. The flange portion 74a extends in the radial direction as far as a position at which the flange portion 74a can abut on each of the pins 90 in the axial direction.

The plurality of the coil springs 92 are interposed between the flange portion 74a of the pressing piston 74 and the counter gear 54 in the axial direction. The coil springs 92 are arranged at equal angular intervals in the circumferential direction of the pressing piston 74. Each of the coil springs 92 urges the pressing piston 74 toward the second output-side rotary member 70b side in the axial direction. Accordingly, with no working fluid supplied to the hydraulic chamber 94, the pressing piston 74 is moved toward the second output-side rotary member 70b side in the axial direction, and the flange portion 74a of the pressing piston 74 is brought into contact with the second output-side rotary member 70b, due to the urging force of the coil springs 92, as shown in FIG. 2. Besides, the coil springs 92 are arranged at equal angular intervals in the circumferential direction of the pressing piston 74 (the flange portion 74a), so the urging force is substantially homogeneously applied to the pressing piston 74 in the circumferential direction.

Besides, when working fluid is supplied to the hydraulic chamber 94, the pressing piston 74 is moved toward the counter gear 54 side in the axial direction against the urging force of the coil springs 92. As a result, the pressing piston 74 is spaced apart from the second output-side rotary member 70b. At this time, each of the pins 90, each of the rings 86, and one end of each of the second struts 72b are moved toward the counter gear 54 side in the axial direction, due to the urging force of each of the torsion coil springs 73b. Incidentally, working fluid is supplied to the hydraulic chamber 94 via an axial oil passage 100 and a radial oil passage 102 that are formed in the countershaft 50.

In the hydraulic actuator 41 configured as described above, with no working fluid supplied to the hydraulic chamber 94, the coil springs 92 that are arranged at equal angular intervals in the circumferential direction substantially homogeneously urge the urging force to the pressing piston 74 in the circumferential direction. Thus, the pressing piston 74 is restrained from inclining. Besides, even when working fluid is supplied to the hydraulic chamber 94, the oil pressure of working fluid homogeneously acts on the pressing piston 74 in the circumferential direction. Therefore, the pressing piston 74 is restrained from inclining. In this manner, the pressing piston 74 is restrained from inclining, so there is no need to provide a mechanism for restraining the pressing piston 74 from inclining, a sensor for detecting the inclination of the pressing piston 74, and the like. Incidentally, the urging force of the coil springs 92 acts as a load for moving the pressing piston 74 toward the second output-side rotary member 70b side in the axial direction in the hydraulic actuator 41, and a force generated by the oil pressure of working fluid in the hydraulic chamber 94 acts as a load for moving the pressing piston 74 toward the counter gear 54 side in the axial direction in the hydraulic actuator 41.

Besides, the hydraulic actuator 41 is arranged on the countershaft 50 as is the case with the two-way clutch TWC. Therefore, the hydraulic actuator 41 can be configured to be adjacent to the two-way clutch TWC in the axial direction. By aggregating members constituting the hydraulic actuator 41 at a position that is adjacent to the two-way clutch TWC, the hydraulic actuator 41 can be compactly configured. Besides, one end of each of the coil springs 92 is held in abutment on the counter gear 54, and the counter gear 54 is used as a member that receives a reaction force of the coil springs 92. Thus, the number of parts is restrained from increasing, and the hydraulic actuator 41 is compact. Furthermore, when the counter gear 54 and the pressing piston 74 are viewed from outside in the radial direction of the countershaft 50, part of the pressing piston 74 overlaps with the counter gear 54. Thus, the mechanism around the hydraulic actuator 41 is compactly configured in the axial direction.

Figure 3:
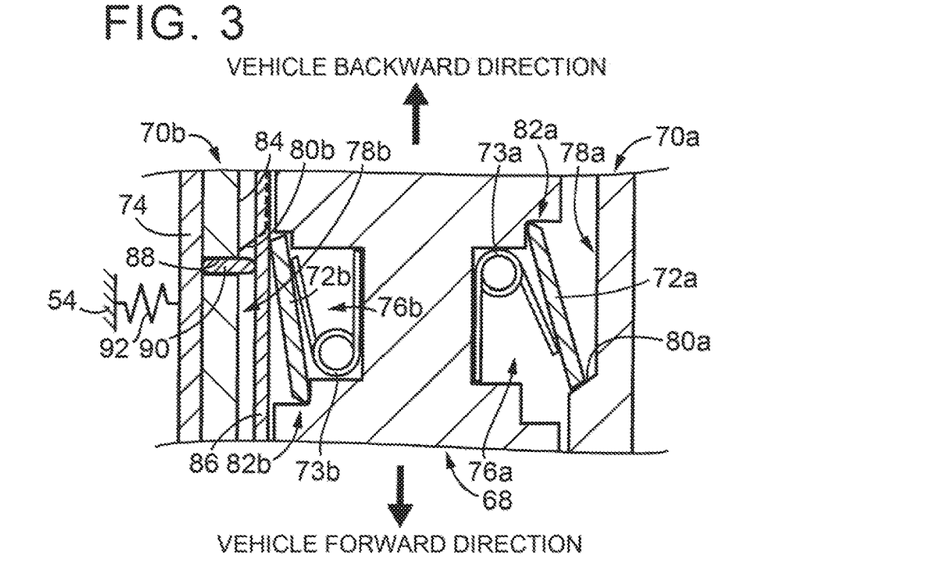
FIG. 3 is a cross-sectional view with part of the two-way clutch of FIG. 2 in a circumferential direction thereof cut off, and is a view showing a state where the two-way clutch has been changed over to a one-way mode.
Figure 4:
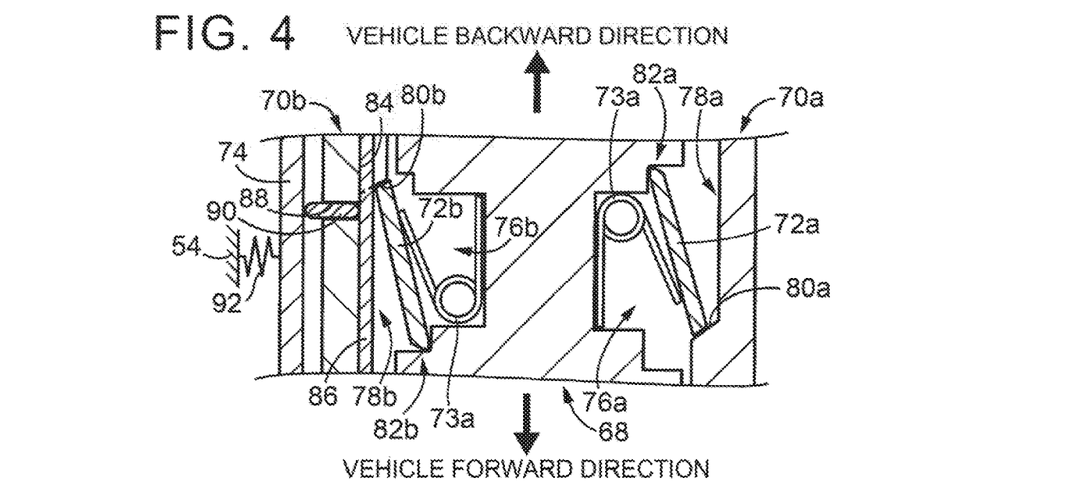
FIG. 4 is a cross-sectional view with part of the two-way clutch of FIG. 2 in the circumferential direction thereof cut off, and is a view showing a state where the two-way clutch has been changed over to a lock mode.

Each of FIGS. 3 and 4 is a cross-sectional view showing part of the two-way clutch TWC of FIG. 2 cut off along the circumferential direction thereof at a position indicated by an alternate long and short dash line A. FIG. 3 shows a state where the two-way clutch TWC has been changed over to the one-way mode, and FIG. 4 shows a state where the two-way clutch TWC has been changed over to the lock mode. Incidentally, a vertical direction on the sheet of each of FIGS. 3 and 4 corresponds to a rotational direction, an upward direction on the sheet corresponds to the vehicle backward direction (a backward rotational direction), and a downward direction on the sheet corresponds to the vehicle forward direction (a forward rotational direction). Besides, a lateral direction on the sheet of each of FIGS. 3 and 4 corresponds to the axial direction of the countershaft 50 (i.e., the direction of the axis CL of rotation), a right side on the sheet corresponds to the large-diameter gear 52 side of FIG. 2, and a left side on the sheet corresponds to the counter gear 54 side of FIG. 2.

As shown in FIGS. 3 and 4, each of the first accommodation portions 76a in which each of the first struts 72a and the each of the torsion coil springs 73a are accommodated is formed on that side of the input-side rotary member 68 which is opposed to the first output-side rotary member 70a in the axial direction (in the lateral direction on the sheet). Each of the first struts 72a is configured as a plate-like member having a predetermined thickness, and is formed lengthwise along the rotational direction (the circumferential direction) as indicated by the cross-sections of FIGS. 3 and 4. Besides, each of the first struts 72a has a predetermined dimension in a direction perpendicular to the sheet of each of FIGS. 3 and 4 (the radial direction in FIG. 2).

One end of each of the first struts 72a in a longitudinal direction thereof is urged toward the first output-side rotary member 70a side by each of the torsion coil springs 73a. Besides, the other end of each of the first struts 72a in the longitudinal direction thereof is held in abutment on each of first step portions 82a formed in the first accommodation portions 76a. Each of the first struts 72a can turn around the other end thereof that abuts on each of the first step portions 82a. Each of the torsion coil springs 73a is interposed between each of the first struts 72a and the input-side rotary member 68, and urges one end of each of the first struts 72a toward the first output-side rotary member 70a.

The first recess portions 78a that are recessed in the direction away from the input-side rotary member 68 are formed in that surface of the first output-side rotary member 70a which is opposed to the input-side rotary member 68 in the axial direction. Each of the first recess portions 78a is shaped such that one end of each of the first struts 72a can be accommodated therein. Besides, each of first wall surfaces 80a that abuts on one end of each of the first struts 72a when the input-side rotary member 68 rotates in the vehicle forward direction (downward on the sheet of each of FIGS. 3 and 4) due to the motive power of the engine 12 is formed at one end of each of the first recess portions 78a in a rotational direction thereof. The above-mentioned first struts 72a, the above-mentioned torsion coil springs 73a, the above-mentioned first accommodation portions 76a, and the above-mentioned first recess portions 78a (the first wall surfaces 80a) constitute the one-way clutch that transmits the motive power acting in the vehicle forward direction to the driving wheels 14 and that blocks the motive power acting in the vehicle backward direction.

Besides, as shown in FIGS. 3 and 4, the second accommodation portions 76b in which the second struts 72b and the torsion coil springs 73b are accommodated are formed in that surface of the input-side rotary member 68 which is opposed to the second output-side rotary member 70b in the axial direction. Each of the second struts 72b is configured as a plate-like member having a predetermined thickness, and is formed in the longitudinal direction along the rotational direction as indicated by the cross-sections of FIGS. 3 and 4. Besides, each of the second struts 72b has a predetermined dimension in the direction perpendicular to the sheet of each of FIGS. 3 and 4 (the radial direction in FIG. 2).

One end of each of the second struts 72b in the longitudinal direction thereof is urged toward the second output-side rotary member 70b side by each of the torsion coil springs 73b. Besides, the other end of each of the second struts 72b in the longitudinal direction thereof is held in abutment on each of second step portions 82b formed in the second accommodation portions 76b respectively. Each of the second struts 72b can turn around the other end thereof that abuts on each of the second step portions 82b. Each of the torsion coil springs 73b is interposed between each of the second struts 72b and the input-side rotary member 68, and urges one end of each of the second struts 72b toward the second output-side rotary member 70b.

The second recess portions 78b that are recessed in the direction away from the input-side rotary member 68 are formed in that surface of the second output-side rotary member 70b which is opposed to the input-side rotary member 68 in the axial direction. Each of the second recess portions 78b is shaped such that one end of each of the second struts 72b can be accommodated therein. Besides, each of second wall surfaces 80b that abuts on one end of each of the second struts 72b when the input-side rotary member 68 rotates in the vehicle backward direction (upward on the sheet of each of FIGS. 3 and 4) due to the motive power of the engine 12 and when the vehicle is caused to coast while running forward with the two-way clutch TWC shown in FIG. 4 changed over to the lock mode is formed at one end of each of the second recess portions 78b in the rotational direction thereof. The above-mentioned second struts 72b, the above-mentioned torsion coil springs 73b, the above-mentioned second accommodation portions 76b, and the above-mentioned second recess portions 78b (the second wall surfaces 80b) constitute the one-way clutch that transmits the motive power acting in the vehicle backward direction to the driving wheels 14 and that blocks the motive power acting in the vehicle forward direction.

Besides, as shown in FIG. 2 as well, the through-holes 88 that penetrate in the axial direction are formed through the second output-side rotary member 70b, and the pins 90 are inserted through these through-holes respectively. One end of each of the pins 90 abuts on the pressing piston 74, and the other end of each of the pins 90 abuts on each of the annular rings 86. The pressing piston 74 is urged toward the second output-side rotary member 70b side by the coil springs 92.

With the two-way clutch TWC shown in FIG. 3 in the one-way mode, the pressing piston 74 is held in abutment on the second output-side rotary member 70b due to the urging force of the coil springs 92. At this time, each of the pins 90 is moved toward the input-side rotary member 68 side by being pressed by the pressing piston 74, and each of the rings 86 is also moved toward the input-side rotary member 68 side in the axial direction by being pressed by each of the pins 90. As a result, one end of each of the second struts 72b moves toward the input-side rotary member 68 side by being pressed against each of the rings 86. Thus, one end of each of the second struts 72b and each of the second wall surfaces 80b are kept from abutting on each other. At this time, the input-side rotary member 68 and the second output-side rotary member 70b are allowed to rotate relatively to each other, so the second struts 72b do not function as the one-way clutch. On the other hand, one end of each of the first struts 72a is urged toward the first output-side rotary member 70a side by each of the torsion coil springs 73a, and can hence abut on each of the first wall surfaces 80a of the first recess portions 78a. That is, in the state shown in FIG. 3, the input-side rotary member 68 and the first output-side rotary member 70a are kept from rotating relatively to each other in the vehicle forward direction.

With the two-way clutch TWC in the one-way mode, each of the first struts 72a can abut on each of the first wall surfaces 80a of the first output-side rotary member 70a. Thus, when the motive power acting in the vehicle forward direction is transmitted to the two-way clutch TWC, one end of each of the first struts 72a and one of the first wall surfaces 80a abut on each other, and the other end of each of the first struts 72a and each of the first step portions 82a abut on each other, as shown in FIG. 3. Thus, the input-side rotary member 68 and the first output-side rotary member 70a are kept from rotating relatively to each other in the vehicle forward direction. In consequence, with the two-way clutch TWC in the one-way mode, the first struts 72a function as the one-way clutch, transmit the motive power acting in the vehicle forward direction to the driving wheels 14, and block the motive power acting in the vehicle backward direction.

With the two-way clutch TWC shown in FIG. 4 in the lock mode, working fluid is supplied to the hydraulic actuator 41 (see FIG. 2). Thus, the pressing piston 74 is moved in the direction away from the second output-side rotary member 70b against the urging force of the coil springs 92. At this time, one end of each of the second struts 72b is moved toward each of the second recess portion 78b sides of the second output-side rotary member 70b by the urging force of each of the torsion coil springs 73b, and can abut on each of the second wall surfaces 80b. Besides, as in the case of the one-way mode of FIG. 3, one end of each of the first struts 72a can abut on each of the first wall surfaces 80a of the first output-side rotary member 70a.

With the two-way clutch TWC in the lock mode, when the motive power acting in the vehicle forward direction is transmitted, one end of each of the first struts 72a abuts on each of the first wall surfaces 80a of the first output-side rotary member 70a, and the other end of each of the first struts 72a abuts on each of the first step portions 82a, as shown in FIG. 4. Thus, the input-side rotary member 68 and the first output-side rotary member 70a are kept from rotating relatively to each other in the vehicle forward direction. Furthermore, with the two-way clutch TWC in the lock mode, when the motive power acting in the vehicle backward direction is transmitted, one end of each of the second struts 72b abuts on each of the second wall surfaces 80b of the second output-side rotary member 70b, and the other end of each of the second struts 72b abuts on each of the second step portions 82b, as shown in FIG. 4. Thus, the input-side rotary member 68 and the second output-side rotary member 70b are kept from rotating relatively to each other in the vehicle backward direction. In consequence, with the two-way clutch TWC in the lock mode, the first struts 72a and the second struts 72b each function as the one-way clutch. The two-way clutch TWC can transmit the motive power acting in the vehicle forward direction and the motive power acting in the vehicle backward direction to the driving wheels 14. Accordingly, for example, when the vehicle runs backward, the changeover of the two-way clutch TWC to the lock mode enables the vehicle to run backward. Besides, when the vehicle coasts, the rotation transmitted from the driving wheel 14 sides is transmitted to the engine 12 side via the two-way clutch TWC by changing over the two-way clutch TWC to the lock mode. Thus, engine braking through the dragging of the engine 12 can be caused.

Besides, with no working fluid supplied to the hydraulic actuator 41, the two-way clutch TWC is set in such a manner as to be changed over to the one-way mode due to the urging force of the coil springs 92. Accordingly, when the vehicle runs with the two-way clutch TWC in the one-way mode, there is no need to supply working fluid to the hydraulic actuator 41.

The operation of the power transmission device 16 configured as described above will be described. When the vehicle starts off or runs at low vehicle speed, a changeover to gear running for causing the vehicle 10 to run by transmitting the motive power of the engine 12 to the driving wheels 14 via the first power transmission path PT1 is made. At this time, the first clutch C1 is engaged, the second clutch C2 is released, and the two-way clutch TWC is changed over to the one-way mode. By engaging the first clutch C1, the motive power of the engine 12 is transmitted to the first power transmission path PT1 side. Besides, the two-way clutch TWC is changed over to the one-way mode, and hence can transmit the motive power acting in the vehicle forward direction. Thus, gear running for transmitting the motive power of the engine 12 to the driving wheels 14 via the first power transmission path PT1 is enabled.

Besides, when the running state of the vehicle 10 shifts from low vehicle speed to intermediate or high vehicle speed, a changeover to belt running for causing the vehicle 10 to run by transmitting the motive power of the engine 12 to the driving wheels 14 via the second power transmission path PT2 is made. At this time, the first clutch C1 is released, and the second clutch C2 is engaged. By engaging the second clutch C2, the motive power of the engine 12 is transmitted to the second power transmission path PT2 side. When the changeover to belt running is made, continuous shift control for changing the speed ratio γcvt of the continuously variable transmission 24 in accordance with the running state of the vehicle 10 as appropriate is performed. Incidentally, continuous shift control of the continuously variable transmission 24 is a known art, so the detailed description thereof will be omitted.

It should be noted herein that when the rotation of the driving wheels 14 is transmitted to the first clutch C1 via the two-way clutch TWC while the vehicle 10 runs at high vehicle speed through belt running, a drum and the like that constitute the first clutch C1 may be rotated at high speed. However, the two-way clutch TWC is idly rotated, and the rotation transmitted from the driving wheel 14 sides is blocked by the two-way clutch TWC, by changing over the two-way clutch TWC to the one-way mode. Accordingly, the rotation of the driving wheels 14 is not transmitted to the first clutch C1, so the first clutch C1 is prevented from being rotated at high speed. Incidentally, conventionally, the dog clutch is provided instead of the two-way clutch TWC, and the rotation transmitted to the first clutch C1 is blocked by disconnecting this dog clutch. In this case, the dog clutch needs to be disconnected every time a changeover from gear running to belt running is made. In the present embodiment, however, the two-way clutch TWC is applied. Thus, there is no need to change over the two-way clutch TWC unless the two-way clutch TWC has been changed over to the lock mode.

Besides, for example, when the vehicle speed rises while the vehicle runs at low vehicle speed, the running mode is changed from gear running to belt running, namely, the power transmission path PT is changed over from the first power transmission path PT1 to the second power transmission path PT2. At this time, a changeover from gear running to belt running is made by controlling the torque capacity of the second clutch C2. When the two-way clutch TWC has been changed over to the one-way mode in a control transition period of the torque capacity of this second clutch C2, the first struts 72a of the two-way clutch TWC function as the one-way clutch, and the transmitted torque in the first power transmission path PT1 in the control transition period is adjusted by the two-way clutch TWC as appropriate. Accordingly, a smooth changeover is made possible in a changeover transition period from gear running to belt running, and a shock is restrained from being caused in the changeover transition period. By the same token, in a changeover transition period from belt running to gear running as well, the two-way clutch TWC transmits the motive power to the first power transmission path PT1 at an appropriate timing, so a shock is restrained from being caused in the changeover transition period. Besides, the changeover of the power transmission path PT is carried out only through the control of the torque capacity of the second clutch C2. Thus, the control is easier to perform than in the case where clutch-to-clutch control of the first clutch C1 and the second clutch C2 is performed.

Besides, when engine braking is caused while the vehicle coasts through gear running, the two-way clutch TWC is changed over to the lock mode. At this time, the rotation transmitted from the driving wheel 14 sides is transmitted to the engine 12 side via the two-way clutch TWC and the first clutch C1, and engine braking can be caused through the dragging of the engine 12.

Besides, when the vehicle runs backward, the first brake B1 is engaged, and the two-way clutch TWC is changed over to the lock mode. When the first brake B1 is engaged, the motive power acting in the vehicle backward direction is transmitted to the first power transmission path PT1. Besides, the motive power acting in the vehicle backward direction is transmitted to the driving wheels 14 via the two-way clutch TWC, by changing over the two-way clutch TWC to the lock mode. Therefore, the vehicle is enabled to run backward.

As described above, even in the case where the two-way clutch TWC that can be changed over to the one-way mode and the lock mode is provided as a secondary clutch in the first power transmission path PT1, the mode of the two-way clutch TWC is changed over in the power transmission device 16. Thus, the vehicle 10 is enabled to run forward and backward. Also, engine braking can also be caused when the vehicle coasts. Besides, the rotation transmitted from the driving wheel 14 sides is blocked by the two-way clutch TWC, by changing over the two-way clutch TWC to the one-way mode during belt running. Thus, the members and the like that constitute the first clutch C1 located on the engine 12 side with respect to the two-way clutch TWC are prevented from rotating at high speed. By thus providing the two-way clutch TWC as the secondary clutch in the first power transmission path PT1, the vehicle is enabled to run in the same manner as in the case where the dog clutch having the synchronization mechanism is provided instead of the two-way clutch TWC. Besides, the two-way clutch TWC is not equipped with any synchronization mechanism. Thus, the number of parts of the two-way clutch TWC is smaller than the number of parts of the dog clutch that is equipped with the synchronization mechanism, and the cost of manufacturing the two-way clutch TWC has been reduced below the cost of manufacturing the dog clutch.

As described above, according to the present embodiment, the two-way clutch TWC that can be changed over to the one-way mode and the lock mode is provided as the secondary clutch. Therefore, for example, by changing over the two-way clutch TWC to the one-way mode, the motive power acting in the vehicle forward direction can be transmitted in the first power transmission path PT1. Besides, by changing over the two-way clutch TWC to the lock mode, the motive power acting in the vehicle backward direction can be transmitted in the first power transmission path PT1. Besides, by changing over the two-way clutch TWC to the one-way mode while the vehicle runs through the use of the second power transmission path PT2, the rotation transmitted from the driving wheel 14 sides can be blocked by the two-way clutch TWC. Therefore, the first clutch C1 and the like, which are located on the engine side with respect to the two-way clutch TWC, are prevented from rotating at high speed. By thus changing over the mode of the two-way clutch TWC, the vehicle is enabled to run forward and backward via the first power transmission path PT1, and the first clutch C1 is prevented from rotating at high speed. Thus, the vehicle can run in the same manner as in the case where the dog clutch having the synchronization mechanism is provided as the secondary clutch in the first power transmission path PT1. Besides, the two-way clutch TWC does not require any synchronization mechanism. Therefore, the number of parts is smaller, and the cost of manufacturing can be further reduced than in the case where the dog clutch having the synchronization mechanism is provided in the first power transmission path PT1.

Besides, according to the present embodiment, the hydraulic actuator 41 for changing over the mode of the two-way clutch TWC is arranged on the countershaft 50 as is the case with the two-way clutch TWC. Therefore, the hydraulic actuator 41 can be compactly configured by aggregating parts constituting the hydraulic actuator 41 at a position that is adjacent to the two-way clutch TWC. Besides, the two-way clutch TWC changes over to the one-way mode with no working fluid supplied to the hydraulic actuator 41, so there is no need to supply working fluid to the hydraulic actuator 41 while the vehicle runs in the one-way mode. As a result, the amount of consumption of working fluid can be reduced. Besides, the coil springs 92 that constitute the hydraulic actuator 41 are interposed between the pressing piston 74 and the counter gear 54. Therefore, the number of parts can be restrained from increasing, by utilizing the counter gear 54 as a member for generating the reaction force of the coil springs 92.

Next, the other embodiments of the disclosure will be described. Incidentally, in the following description, components that are identical to those of the foregoing embodiment will be denoted by the same reference symbols respectively, and the description thereof will be omitted.

Figure 5:
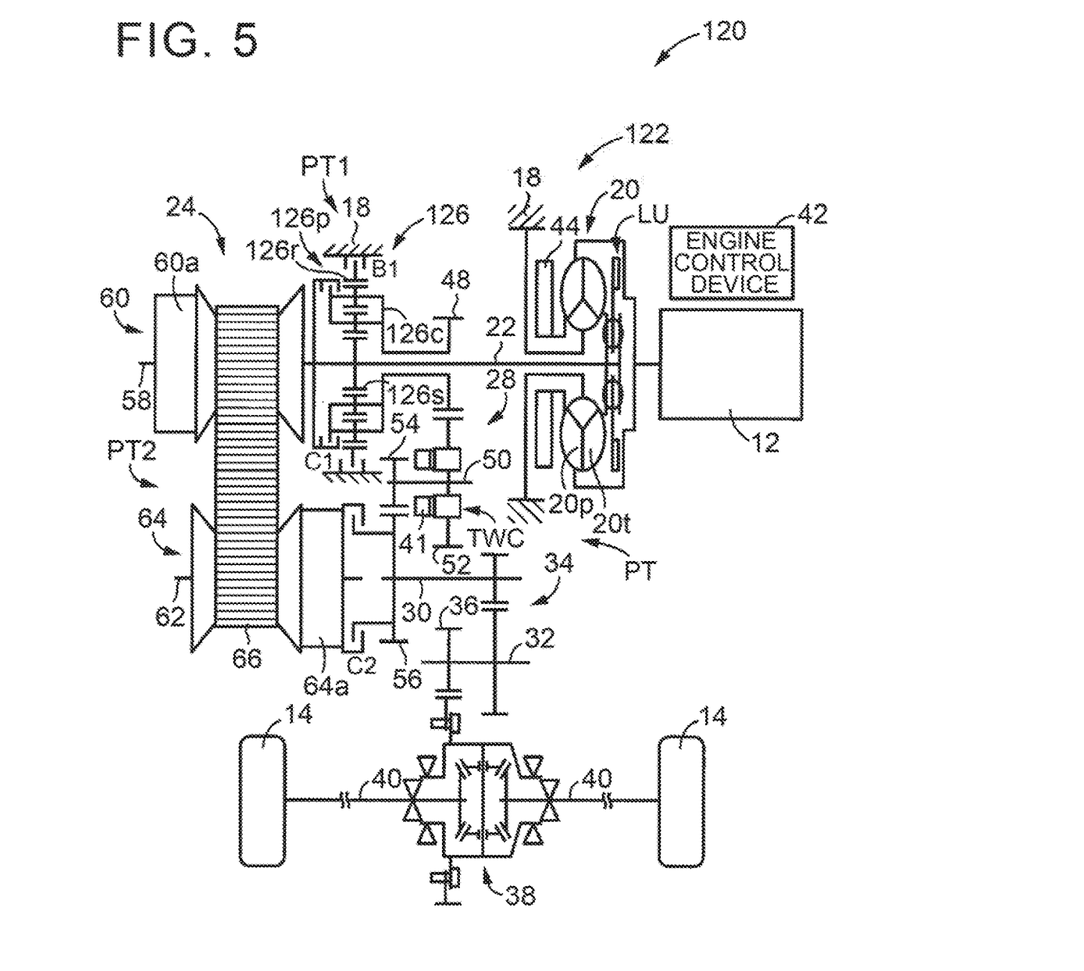
FIG. 5 is a view illustrating the schematic configuration of a vehicle corresponding to another one of the embodiments of the disclosure.

FIG. 5 is a view illustrating the schematic configuration of a vehicle 120 corresponding to another one of the embodiments of the disclosure. In the vehicle 120 of the present embodiment, a vehicle power transmission device 122 (hereinafter referred to as the power transmission device 122) is provided between the engine 12 and the driving wheels 14.

A comparison between the power transmission device 122 and the power transmission device 16 according to the foregoing first embodiment reveals that the former is different in the structure of a forward/backward changeover device 126 from the latter. The structure of the forward/backward changeover device 126 that is different from that of the foregoing first embodiment will be described hereinafter.

The forward/backward changeover device 126 is equipped with a double pinion-type planetary gear device 126p, the first clutch C1, and the first brake B1. The planetary gear device 126p is a differential mechanism having three rotary elements, namely, a sun gear 126s as an input element, a carrier 126c as an output element, and a ring gear 126r as a reaction element. The sun gear 126s is coupled to the input shaft 22. The ring gear 126r is selectively coupled to the case 18 via the first brake B1. The carrier 126c is coupled to the small-diameter gear 48. The carrier 126c and the sun gear 126s are selectively coupled to each other via the first clutch C1.

Even in the case where the sun gear 126s functions as the input element and the carrier 126c functions as the output element in the forward/backward changeover device 126 as described above, the motive of the engine 12 is transmitted, as the motive power acting in the vehicle forward direction, to the small-diameter gear 48 via the carrier 126c when the first clutch C1 is engaged, and the motive power of the engine 12 is transmitted, as the motive power acting in the vehicle backward direction, to the small-diameter gear 48 via the carrier 126c when the first brake B1 is engaged. Accordingly, even in the case where the forward/backward changeover device 126 is configured as described above, the vehicle 10 can be caused to run in the same manner as in the foregoing embodiment. As described hitherto, the forward/backward changeover device 126 of the present embodiment also makes it possible to obtain an effect similar to that of the foregoing embodiment. Incidentally, the forward/backward changeover device 126 is configured as the double pinion-type planetary gear device as is the case with the forward/backward changeover device 26 of the foregoing embodiment. However, the disclosure is applicable even if the forward/backward changeover device is configured as a single pinion-type planetary gear device.

Figure 6:
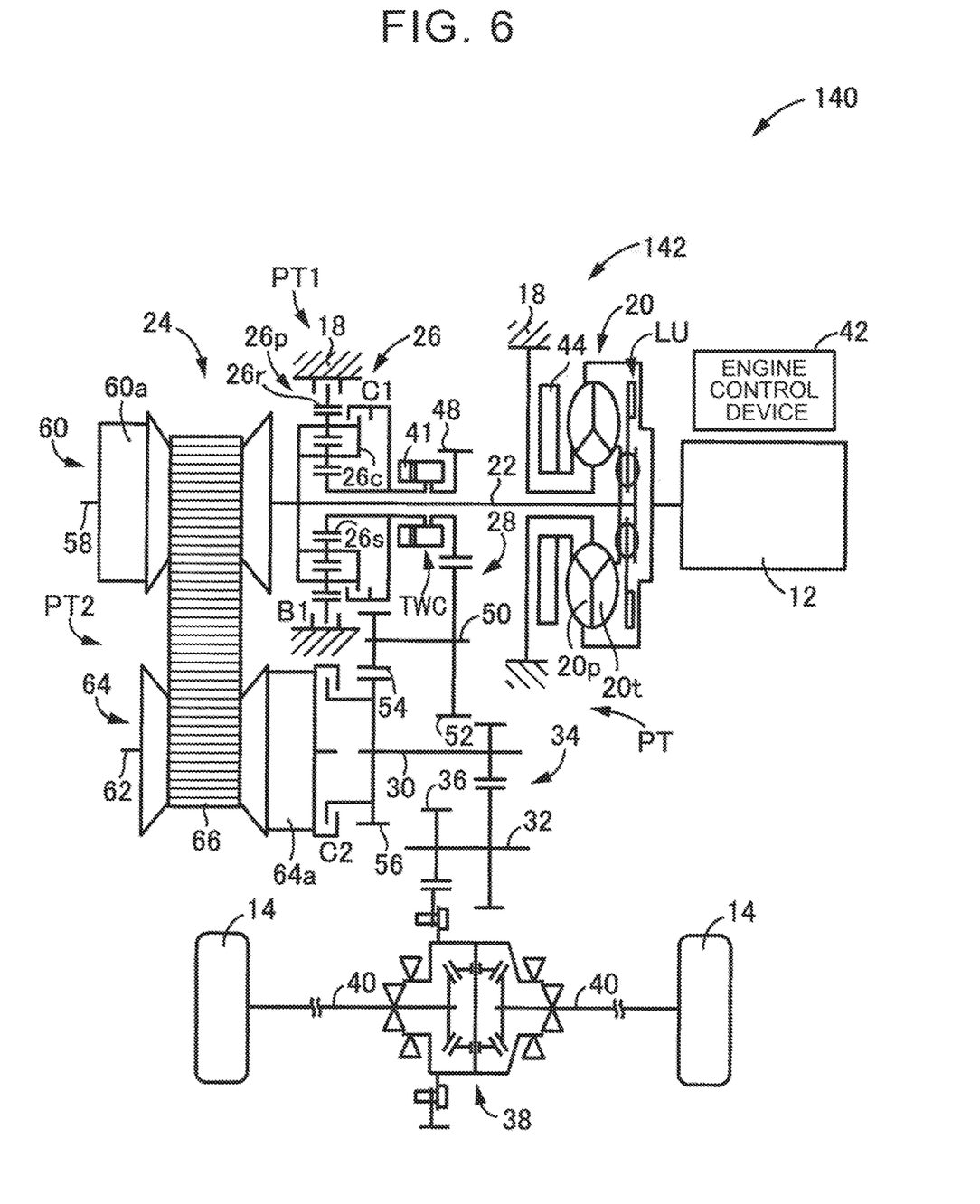
FIG. 6 is a view illustrating the schematic configuration of a vehicle corresponding to still another one of the embodiments of the disclosure.

FIG. 6 is a view illustrating the schematic configuration of a vehicle 140 corresponding to still another one of the embodiments of the disclosure. In the vehicle 140 of the present embodiment, a vehicle power transmission device 142 (hereinafter referred to as the power transmission device 142) is provided between the engine 12 and the driving wheels 14.

A comparison between the power transmission device 142 and the power transmission device 16 according to the foregoing first embodiment reveals that the former is different from the latter in location where the two-way clutch TWC is arranged. In concrete terms, the two-way clutch TWC is arranged on the same rotary shaft as the input shaft 22. What is different from the foregoing first embodiment will be described hereinafter.

In the power transmission device 142, the two-way clutch TWC is arranged on the same rotary shaft as the input shaft 22. The two-way clutch TWC is interposed between the carrier 26c of the forward/backward changeover device 26 and the small-diameter gear 48, on an outer periphery of the input shaft 22. Accordingly, in the present embodiment, the forward/backward changeover device 26, the two-way clutch TWC, and the gear mechanism 28 are arranged in this sequence from the engine 12 side, in the first power transmission path PT1.

As described above, even in the case where the two-way clutch TWC is arranged on the same rotary shaft as the input shaft 22, the vehicle can run in the same manner as in the foregoing first embodiment. For example, when the vehicle runs forward, the vehicle is enabled to run forward through the motive power of the engine 12, by changing over the two-way clutch TWC to the one-way mode. When the vehicle runs backward, the vehicle is enabled to run backward through the motive power of the engine 12, by changing over the two-way clutch TWC to the lock mode. At the time of belt running, the rotation of the driving wheels 14 is transmitted to the gear mechanism 28 by changing over the two-way clutch TWC to the one-way mode. However, the transmission of the rotation to the first clutch C1, which is located on the engine 12 side with respect to the two-way clutch TWC, is blocked by the two-way clutch TWC. Accordingly, the first clutch C1 is prevented from rotating at high speed. Besides, when the vehicle coasts, engine braking can be caused by changing over the two-way clutch TWC to the lock mode. Accordingly, even in the case where the two-way clutch TWC is arranged on the same rotary shaft as the input shaft 22, an effect similar to that of the foregoing embodiment is obtained.

Figure 7:
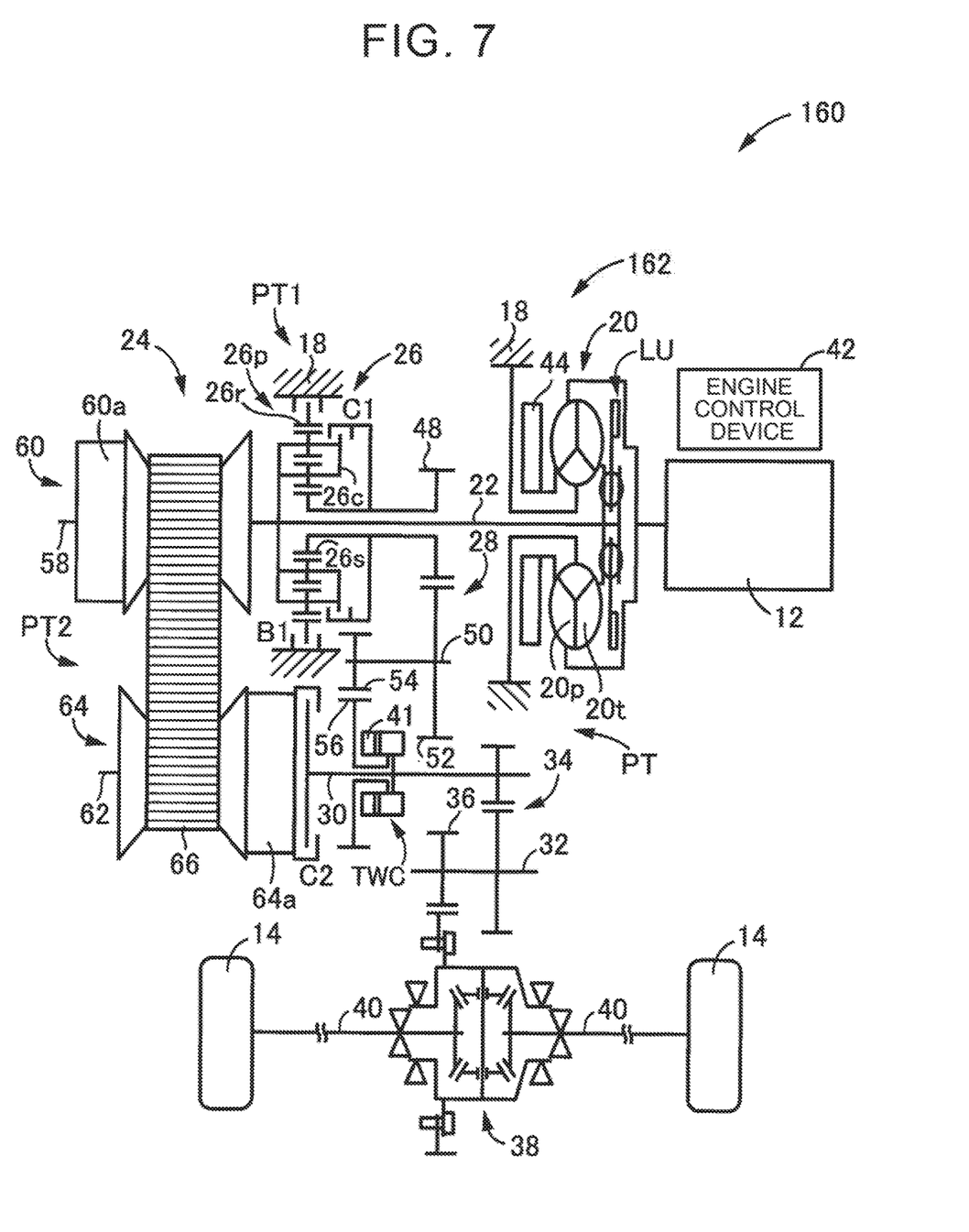
FIG. 7 is a view illustrating the schematic configuration of a vehicle corresponding to still another one of the embodiments of the disclosure.

FIG. 7 is a view illustrating the schematic configuration of a vehicle 160 corresponding to still another one of the embodiments of the disclosure. In the vehicle 160 of the present embodiment, a vehicle power transmission device 162 (hereinafter referred to as the power transmission device 162) is provided between the engine 12 and the driving wheels 14.

A comparison between the power transmission device 162 and the power transmission device 16 according to the foregoing first embodiment reveals that the former is different from the latter in location where the two-way clutch TWC is arranged. In concrete terms, the two-way clutch TWC is arranged on the same rotary shaft as the output shaft 30. What is different from the foregoing first embodiment will be described hereinafter.

In the power transmission device 162, the two-way clutch TWC is arranged on the same rotary shaft as the output shaft 30. The two-way clutch TWC is interposed between the output gear 56 and the output shaft 30, on an outer periphery of the output shaft 30. As described above, even in the case where the two-way clutch TWC is arranged on the same rotary shaft as the output shaft 30, the vehicle is enabled to run in the same manner as in the foregoing first embodiment. For example, when the vehicle runs forward, the vehicle is enabled to run forward through the power of the engine 12, by changing over the two-way clutch TWC to the one-way mode. When the vehicle runs backward, the vehicle is enabled to run backward through the motive power of the engine 12, by changing over the two-way clutch TWC to the lock mode. At the time of belt running, the rotation transmitted from the driving wheel 14 sides is blocked by the two-way clutch TWC, by changing over the two-way clutch TWC to the one-way mode. Therefore, the gear mechanism 28 and the first clutch C1 are prevented from rotating at high speed. Besides, when the vehicle coasts, engine braking can be caused by changing over the two-way clutch TWC to the lock mode. Accordingly, even in the case where the two-way clutch TWC is arranged on the same rotary shaft as the output shaft 30, an effect similar to that of the foregoing embodiment is obtained.

Figure 8:
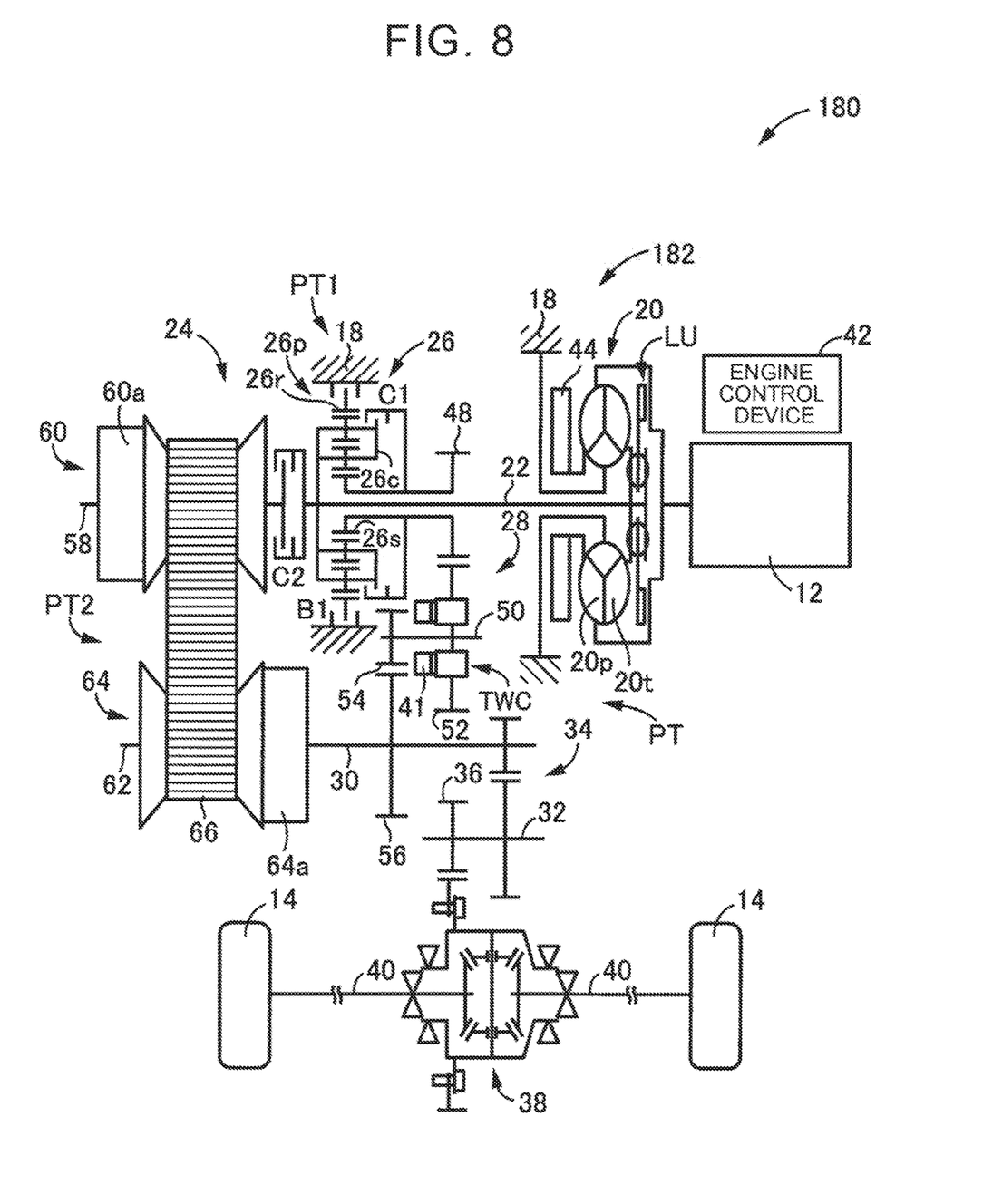
FIG. 8 is a view illustrating the schematic configuration of a vehicle corresponding to still another one of the embodiments of the disclosure.

FIG. 8 is a view illustrating the schematic configuration of a vehicle 180 corresponding to still another one of the embodiments of the disclosure. In the vehicle 180 of the present embodiment, a vehicle power transmission device 182 (hereinafter referred to as the power transmission device 182) is provided between the engine 12 and the driving wheels 14.

A comparison between the power transmission device 182 and the power transmission device 16 according to the foregoing first embodiment reveals that the former is different from the latter in location where the second clutch C2 is arranged. In concrete terms, the second clutch C2 is arranged on the same rotary shaft as the input shaft 22. What is different from the foregoing first embodiment will be described hereinafter.

In the power transmission device 182, the second clutch C2 is provided between the input shaft 22 and the primary shaft 58 of the primary pulley 60. Accordingly, the second clutch C2 and the continuously variable transmission 24 are arranged in this sequence from the engine 12 side in the second power transmission path PT2.

As described above, even in the case where the second clutch C2 is arranged on the same rotary shaft as the input shaft 22, the vehicle is enabled to run in the same manner as in the foregoing embodiment. Besides, the second clutch C2 is arranged on the same rotary shaft as the input shaft 22, so the torque capacity of the second clutch C2 can be made smaller than in the case where the second clutch C2 is arranged on the same rotary shaft as the output shaft 30. As a result, the cost of manufacturing the second clutch C2 can be reduced, and the controllability of the second clutch C2 is also enhanced.

The embodiment of the disclosure has been described above in detail based on the drawings, but the disclosure is applicable in other aspects as well.

For example, in the foregoing embodiment, the two-way clutch TWC is configured to be changeable over between the one-way mode in which the motive power acting in the vehicle forward direction is transmitted and the motive power acting in the vehicle backward direction is blocked, and the lock mode in which the motive power acting in the vehicle forward direction and the motive power acting in the vehicle backward direction are transmitted, but the disclosure is not necessarily limited thereto. For example, a free mode in which the motive power in the vehicle forward direction and the motive power in the vehicle backward direction are blocked, and a mode in which only the motive power acting in the vehicle backward direction is transmitted may be added to the one-way mode and the lock mode.

Besides, in the foregoing embodiment, the structure of the two-way clutch TWC is not necessarily limited to that of the present embodiment. For example, the two-way clutch may be constituted of a first one-way clutch and a second one-way clutch that are provided separately from each other, the first one-way clutch may be configured to be able to transmit the motive power acting in the vehicle forward direction, the second one-way clutch may be configured to be able to transmit the motive power acting in the vehicle backward direction, and furthermore, the second one-way clutch may be configured to be changeable over to a mode in which the motive power acting in the vehicle backward direction is blocked. In short, as long as the two-way clutch can be changed over to at least the one-way mode and the lock mode, the structure thereof can be changed as appropriate. Incidentally, in the aforementioned configuration, the first one-way clutch may also be configured to be changeable over to a mode in which the motive power acting in the vehicle forward direction is blocked.

Besides, in the foregoing embodiment, the gear ratio EL in the first power transmission path PT1 that is constituted of the gear mechanism 28 is set as a value larger than the lowermost speed ratio γmax of the continuously variable transmission 24 as the maximum speed ratio in the second power transmission path PT2, but the disclosure is not necessarily limited thereto. For example, the gear ratio EL may be set to a value smaller than the lowermost speed ratio γmax of the continuously variable transmission 24, namely, on the high side.

Besides, in the foregoing embodiment, the belt-type continuously variable transmission 24 is arranged on the second power transmission path PT2, but the disclosure is not necessarily limited to the belt-type continuously variable transmission. For example, this belt-type continuously variable transmission can be replaced with a toroidal-type continuously variable transmission or the like as appropriate.

Besides, in the foregoing embodiment, the hydraulic actuator 41 is subjected to differential operation by the oil pressure of working fluid, but the actuator is not necessarily limited thereto. For example, the actuator may be driven by an electric motor.

Besides, in the foregoing embodiment, the first struts 72a are arranged on the input-side rotary member 68, and the first recess portions 78a are formed in the first output-side rotary member 70a. However, the first recess portions 78a may be formed in the input-side rotary member 68, and the first struts 72a may be arranged on the first output-side rotary member 70a.

Besides, in the foregoing embodiment, the hydraulic actuator 41 is arranged between the counter gear 54 and the input-side rotary member 68. However, the hydraulic actuator 41 may be arranged on a back side of the counter gear 54 with respect to the input-side rotary member 68. In this case, the hydraulic actuator 41 is arranged adjacent to the second output-side rotary member 70b, the first struts 72a, which are interposed between the input-side rotary member 68 and the second output-side rotary member 70b, are configured to be changeable over by the hydraulic actuator 41, and the first struts 72a function as the one-way clutch that transmits the motive power acting in the vehicle backward direction and that blocks the motive power acting in the vehicle forward direction.

Besides, in the foregoing embodiment, when no working fluid is supplied to the hydraulic actuator 41, the two-way clutch TWC changes over to the one-way mode. However, the two-way clutch TWC may be configured to change over to the lock mode when no working fluid is supplied to the hydraulic actuator 41.

Besides, in the foregoing embodiment, the two-way clutch TWC can transmit the motive power acting in the vehicle forward direction and the motive power acting in the vehicle backward direction upon being changed over to the lock mode, but the disclosure is not necessarily limited thereto. In concrete terms, the two-way clutch is only required to transmit the motive power acting in the vehicle backward direction, and may not necessarily transmit the motive power acting in the vehicle forward direction.

Incidentally, the foregoing is nothing more than the embodiment. The disclosure can be carried out in aspects subjected to various alterations and improvements based on the knowledge of those skilled in the art.

What is claimed is:

1. A power transmission device for a vehicle, the power transmission device comprising:
    a first power transmission path that is provided between an engine and a driving wheel, the first power transmission path including a first clutch and a secondary clutch that is provided on the driving wheel side with respect to the first clutch;
    a second power transmission path that is provided between the engine and the driving wheel and that is provided in parallel with the first power transmission path, the second power transmission path including a continuously variable transmission and a second clutch, wherein:
    the secondary clutch is configured to make a changeover between a first mode and a second mode, the first mode ensuring that a first motive power acting in a normal rotation direction is transmitted and that a second motive power acting in a reverse rotation direction is blocked, and the second mode ensuring that at least the second motive power acting in the reverse rotation direction is transmitted; and
    an actuator for making the changeover between the first mode of the secondary clutch and the second mode of the secondary clutch, wherein:
    the actuator is provided on a same rotary shaft as the secondary clutch, and
    the secondary clutch is set in such a manner as to change over to the first mode with no working fluid supplied to the actuator and is set in such a manner as to change over to the second mode with working fluid supplied to the actuator.

2. The power transmission device for the vehicle according to claim 1, wherein the secondary clutch includes an input-side rotary member that is coupled to the engine in such a manner as to enable transmission of a motive power, an output-side rotary member that is coupled to the driving wheel in such a manner as to enable transmission of the motive power, and a first strut and a second strut that are interposed between the input-side rotary member and the output-side rotary member, the first strut is configured to keep the input-side rotary member and the output-side rotary member from rotating relatively to each other when the first motive power acting in the normal rotation direction is transmitted to the secondary clutch in the first mode, and the second strut is configured to keep the input-side rotary member and the output-side rotary member from rotating relatively to each other when the second motive power acting in the reverse rotation direction is transmitted to the secondary clutch in the second mode.

3. The power transmission device for the vehicle according to claim 1, wherein the actuator includes a pressing piston and a spring, the pressing piston is provided at a position that is adjacent to an output-side rotary member in an axial direction of the rotary shaft, the spring is configured to abut on the pressing piston and urge the pressing piston toward the output-side rotary member, and the spring is interposed between the pressing piston and a counter gear that is provided on the rotary shaft, in the axial direction of the rotary shaft.

4. The power transmission device for the vehicle according to claim 3, wherein part of the pressing piston overlaps with the counter gear when the counter gear and the pressing piston are viewed from outside in a radial direction of the rotary shaft.

* * * * *